(12) United States Patent
Saito et al.

(10) Patent No.: US 11,048,246 B2
(45) Date of Patent: Jun. 29, 2021

(54) OPERATION ASSISTANCE DEVICE AND OPERATION ASSISTANCE METHOD

(71) Applicant: Hitachi, Ltd., Tokyo (JP)

(72) Inventors: Nao Saito, Tokyo (JP); Kenta Kirihara, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 16/097,909

(22) PCT Filed: Jun. 30, 2017

(86) PCT No.: PCT/JP2017/024111
§ 371 (c)(1),
(2) Date: Oct. 31, 2018

(87) PCT Pub. No.: WO2018/012319
PCT Pub. Date: Jan. 18, 2018

(65) Prior Publication Data
US 2019/0146468 A1    May 16, 2019

(30) Foreign Application Priority Data

Jul. 14, 2016   (JP) .............................. JP2016-139643

(51) Int. Cl.
*G05B 13/02*   (2006.01)
*G05B 23/02*   (2006.01)
(Continued)

(52) U.S. Cl.
CPC ....... *G05B 23/024* (2013.01); *G05B 23/0221* (2013.01); *G05B 23/0235* (2013.01);
(Continued)

(58) Field of Classification Search
CPC .............................. G05B 23/024; G06F 16/00
(Continued)

(56) References Cited

U.S. PATENT DOCUMENTS 6,909,981 B2 * 6/2005 Gavin ................. H01J 49/0036
702/67
2013/0282336 A1   10/2013   Maeda et al.
(Continued)

FOREIGN PATENT DOCUMENTS

JP    2000-348226 A    12/2000
JP    2003-23730 A      1/2003
(Continued)

OTHER PUBLICATIONS

International Search Report (PCT/ISA/210) issued in PCT Application No. PCT/JP2017/024111 dated Aug. 15, 2017 with English translation (four (4) pages).
(Continued)

*Primary Examiner* — Ricky Go
(74) *Attorney, Agent, or Firm* — Crowell & Moring LLP

(57) ABSTRACT

A manipulation candidate classification unit provided in this operation assistance device classifies manipulation logs associated with a plurality of events stored in a past case database, as manipulation candidates, on the basis of measured value feature quantity tolerance ranges, and groups the classified manipulation candidates and the measured value feature quantity tolerance ranges together to create manipulation candidate groups. A manipulation candidate search unit searches a manipulation candidate database for a manipulation candidate group associated with a feature quantity that is associated with a past event and that is close to a feature quantity associated with a new event, and outputs the found manipulation candidate group to an output unit.

8 Claims, 10 Drawing Sheets

(51) Int. Cl.
  *G06F 16/00* (2019.01)
  *G06F 16/17* (2019.01)
  *G06Q 50/06* (2012.01)

(52) U.S. Cl.
  CPC .......... *G06F 16/00* (2019.01); *G06F 16/1734* (2019.01); *G06Q 50/06* (2013.01)

(58) Field of Classification Search
  USPC .......................................................... 702/60
  See application file for complete search history.

(56) References Cited

U.S. PATENT DOCUMENTS

2014/0006398 A1\* 1/2014 Johnson ............ H02J 13/00034
  707/736
2015/0220847 A1 8/2015 Shibuya et al.

FOREIGN PATENT DOCUMENTS

JP  2012-137934 A  7/2012
JP  2015-148867 A  8/2015

OTHER PUBLICATIONS

Japanese-language Written Opinion (PCT/ISA/237) issued in PCT Application No. PCT/JP2017/024111 dated Aug. 15, 2017 (four (4) pages).
Japanese-language Office Action issued in Japanese Application No. 2016-139643 dated Feb. 4, 2020 with English translation (eight pages).

\* cited by examiner

[FIG. 1]
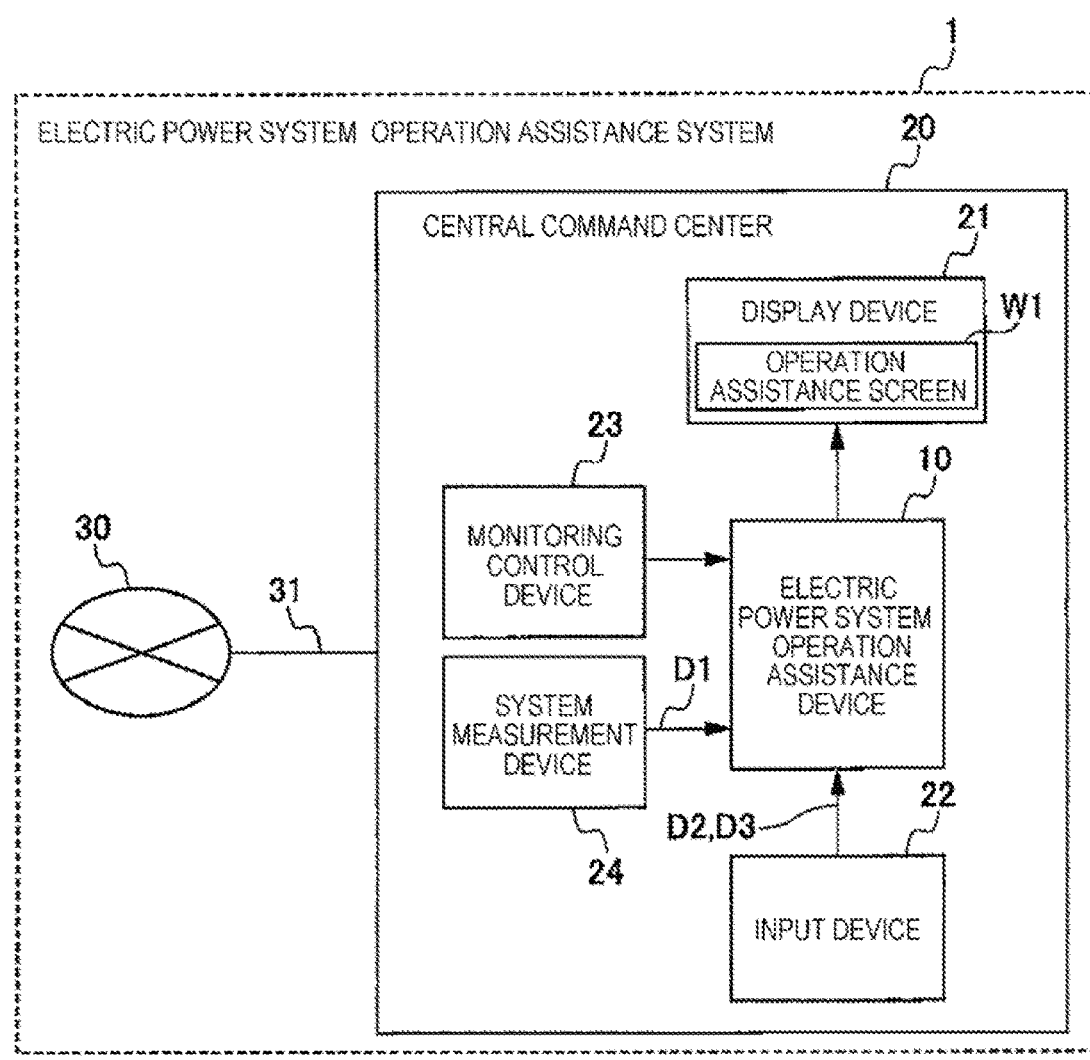

[FIG. 2]
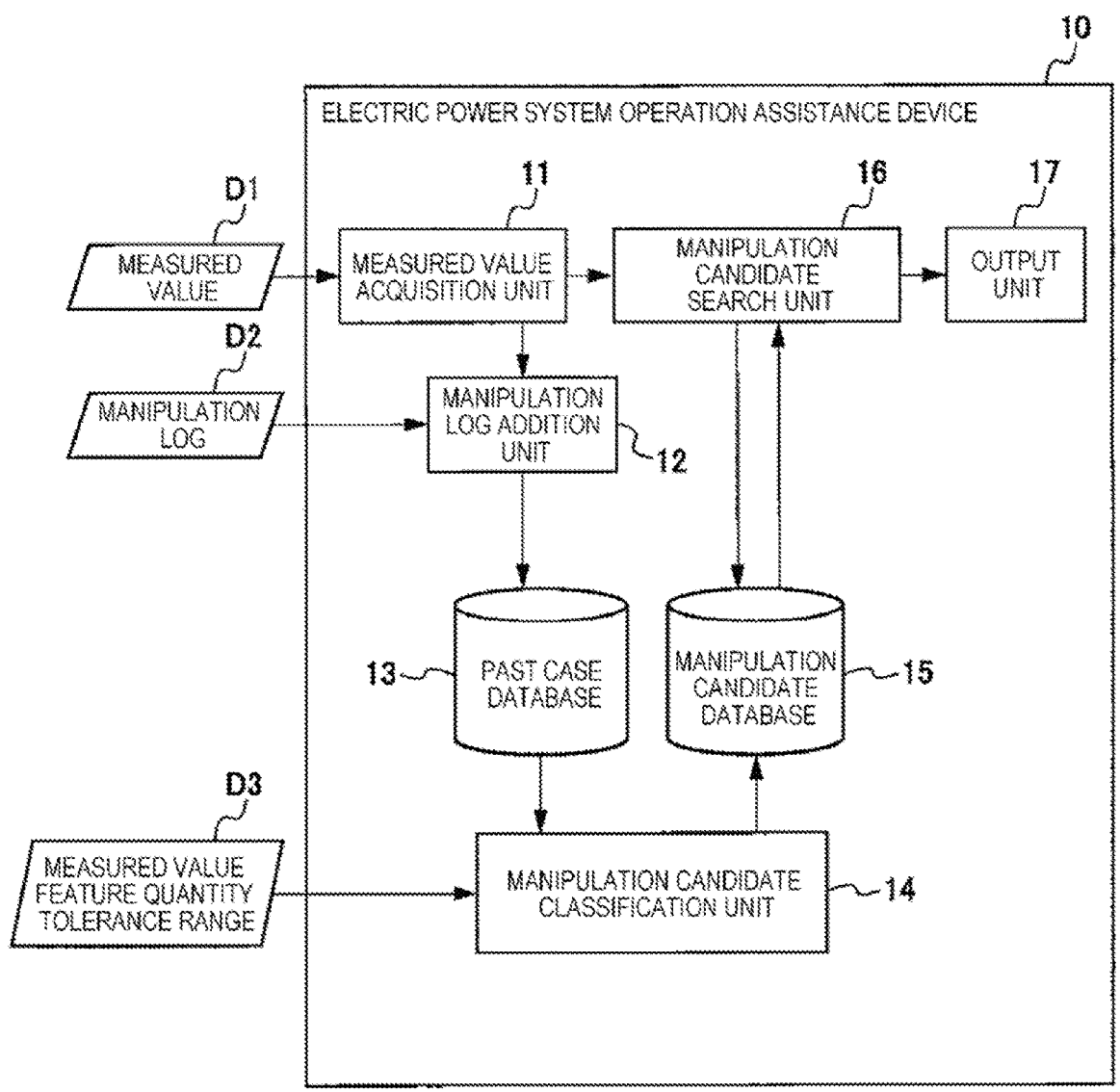

[FIG. 3]
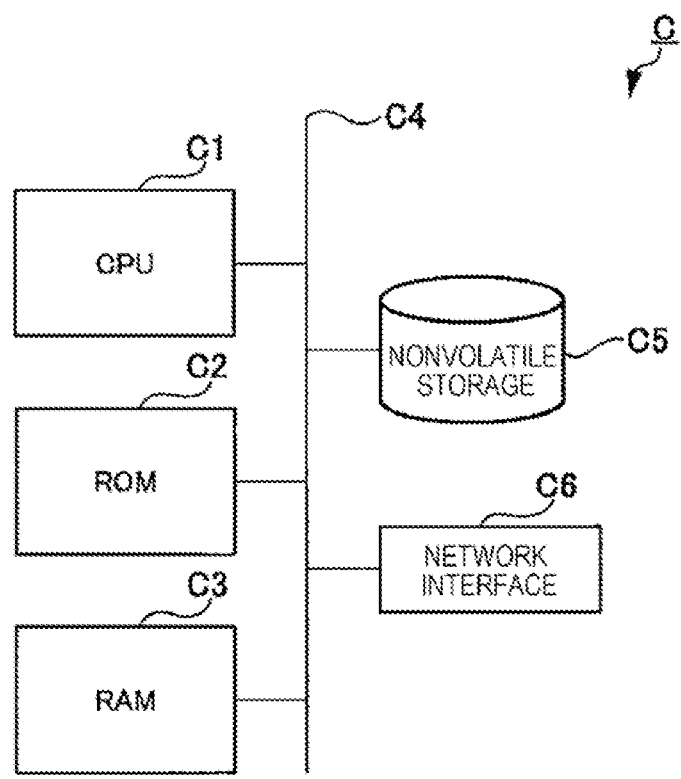

[FIG. 4]
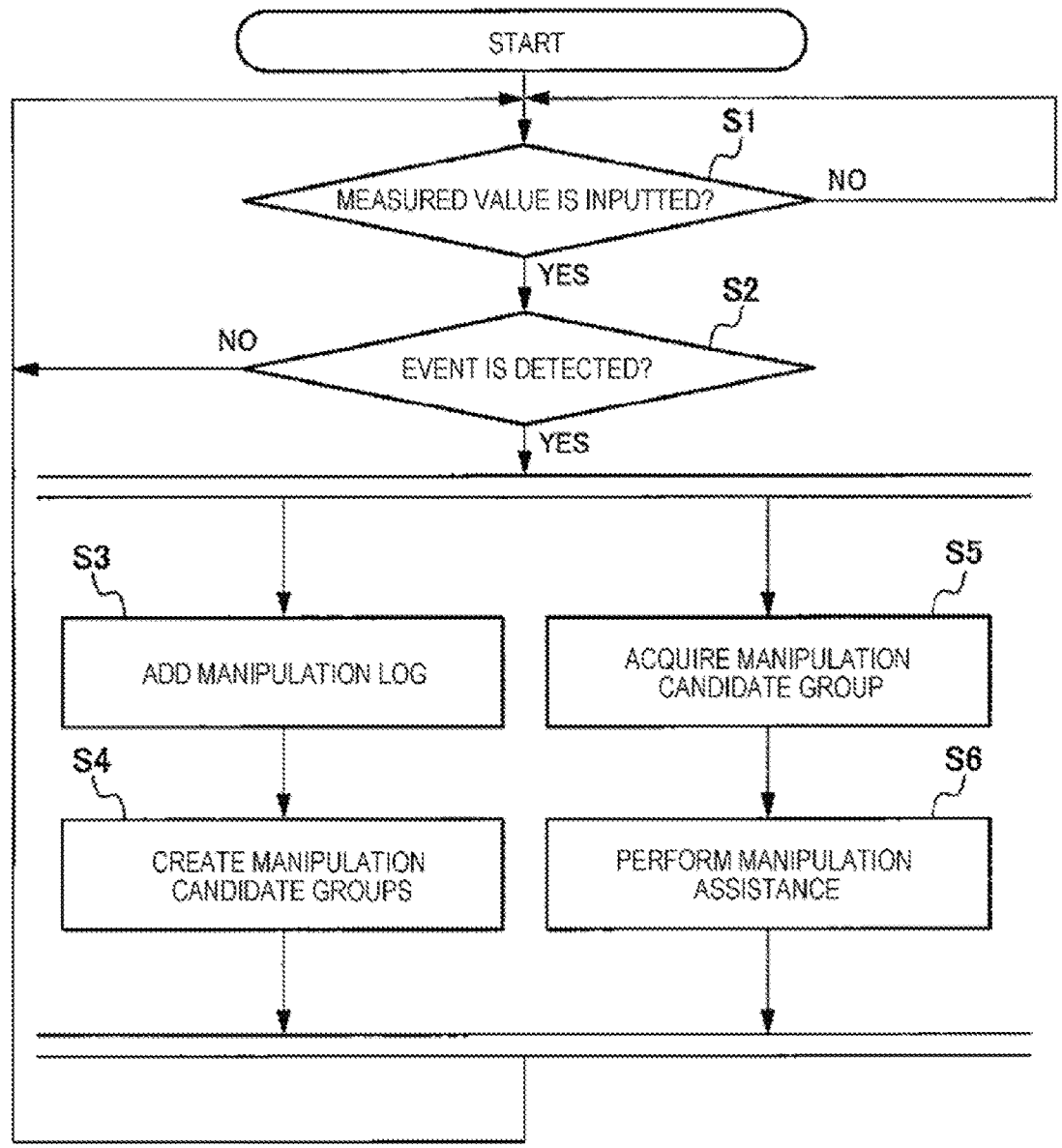

[FIG. 5]
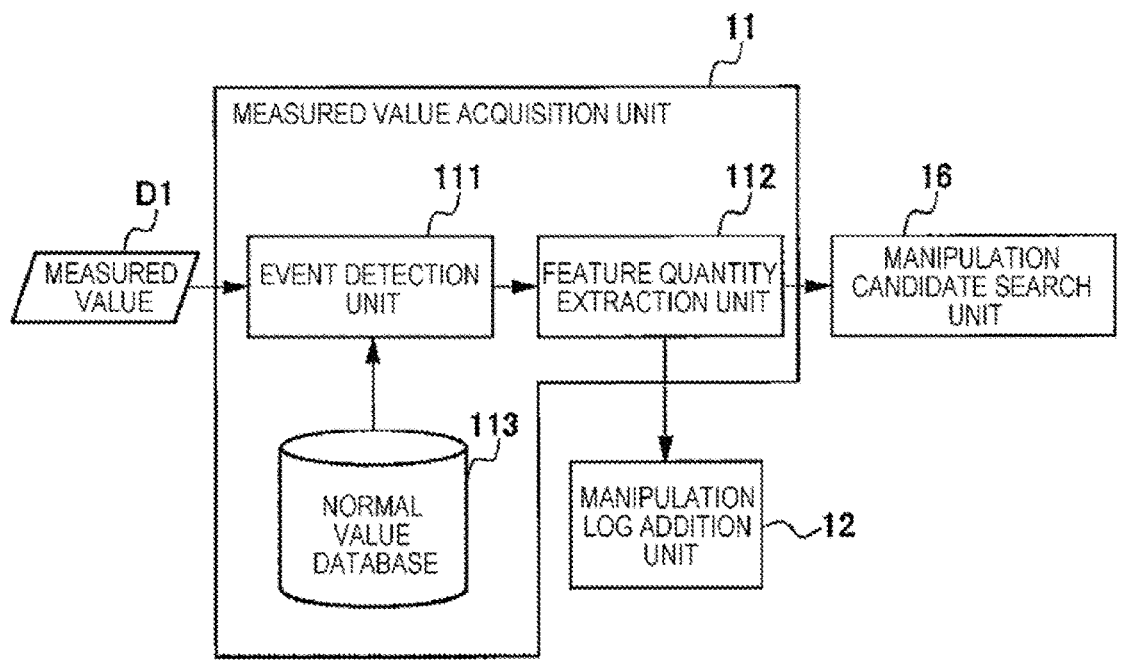
[FIG. 6]
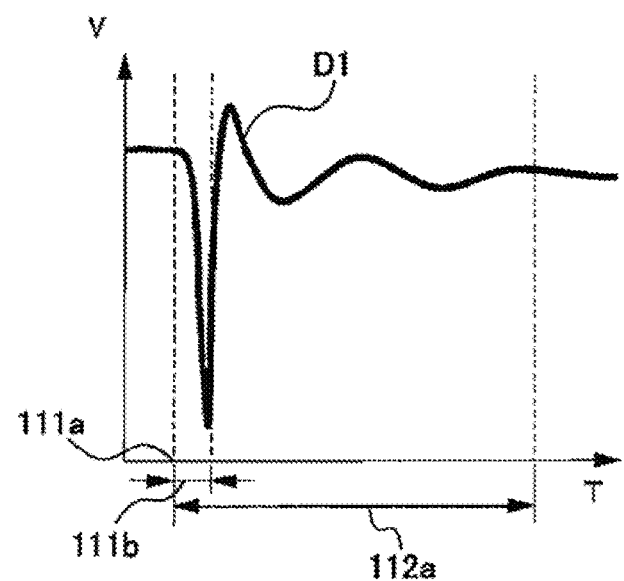

[FIG. 7]

| | | FEATURE QUANTITY | | | | |
|---|---|---|---|---|---|---|
| | | EVENT DETECTION TIME | FEATURE QUANTITY EXTRACTION TIME | VOLTAGE APPROXIMATION FORMULA COEFFICIENT 1 | ... | VOLTAGE APPROXIMATION FORMULA COEFFICIENT N |
| MEASURED VALUE | DEVICE NUMBER 1 | 2016/5/14 11:00 | 12.50 SECONDS | a1 | b1 | c1 |
| | DEVICE NUMBER 2 | 2016/5/14 11:00 | 12.50 SECONDS | a2 | b2 | c2 |
| | DEVICE NUMBER 3 | 2016/5/14 11:00 | 12.50 SECONDS | a3 | b3 | c3 |

| | | FEATURE QUANTITY | | | | |
|---|---|---|---|---|---|---|
| | | EVENT DETECTION TIME | FEATURE QUANTITY EXTRACTION TIME | VOLTAGE APPROXIMATION FORMULA COEFFICIENT 1 | ... | VOLTAGE APPROXIMATION FORMULA COEFFICIENT N |
| MEASURED VALUE | DEVICE NUMBER 1 | 2016/5/14 11:00 | 12.50 SECONDS | a1 | b1 | c1 |
| | DEVICE NUMBER 2 | 2016/5/14 11:00 | 12.50 SECONDS | a2 | b2 | c2 |
| | DEVICE NUMBER 3 | 2016/5/14 11:00 | 12.50 SECONDS | a3 | b3 | c3 |
| MANIPULATION LOG | | Op_A | | | | |
| EVENT RECOGNITION NUMBER | | Xn | | | | |

[FIG. 9]
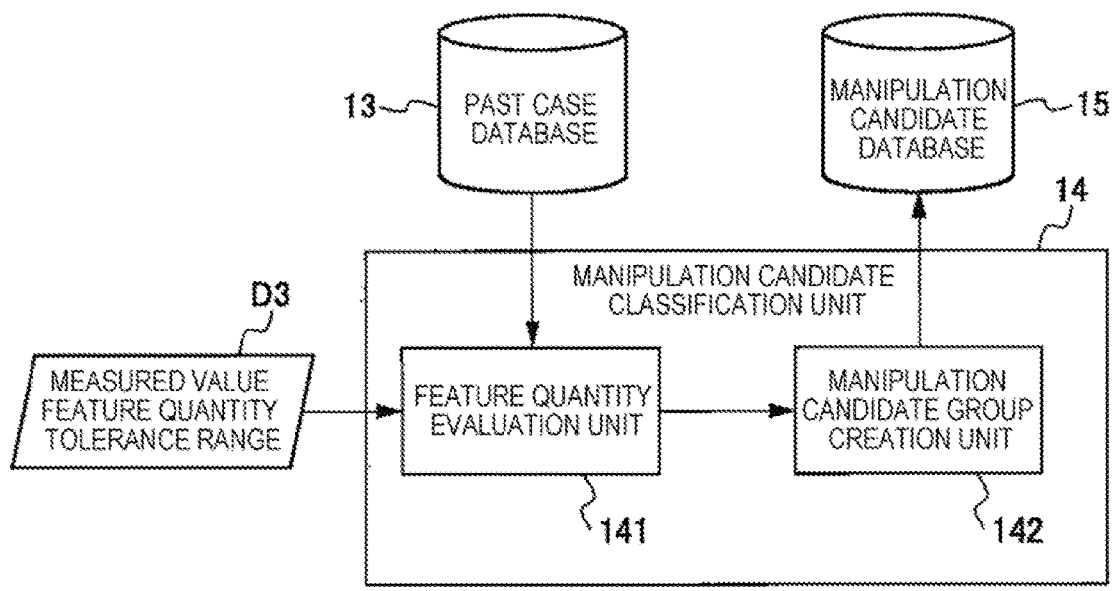
[FIG. 10]
| | | MANIPULATION CANDIDATE GROUP | | |
|---|---|---|---|---|
| | | 1 | 2 | 3 |
| MEASURED VALUE FEATURE QUANTITY TOLERANCE RANGE | DEVICE NUMBER 1 | x11~y11 | x12~y12 | x13~y13 |
| | DEVICE NUMBER 2 | x21~y21 | x22~y22 | x23~y23 |
| | DEVICE NUMBER 3 | x31~y31 | x32~y32 | x33~y33 |
| MANIPULATION CANDIDATE | | Op_A ◎ | Op_C ◎ | Op_C ◎ |
| | | Op_B △ | | Op_D △ |
| | | Op_C × | | |
15 / D3

[FIG. 11]
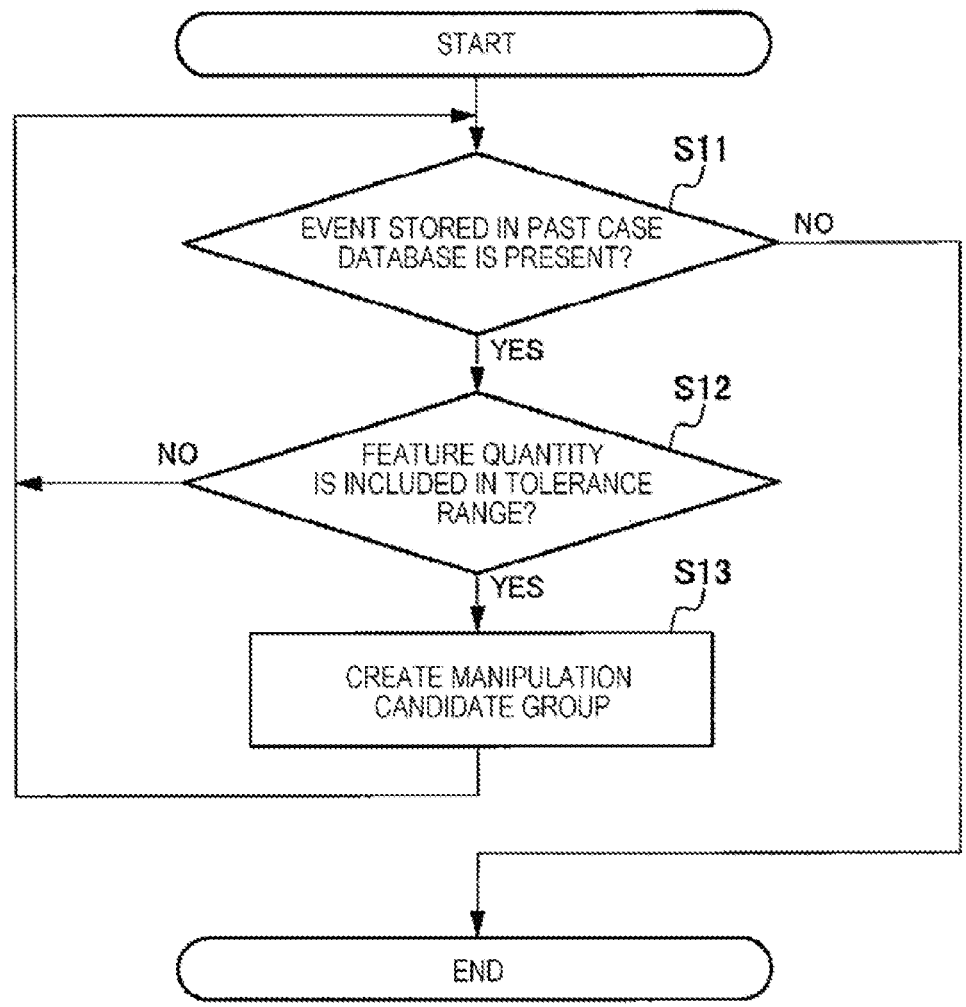

[FIG. 12]
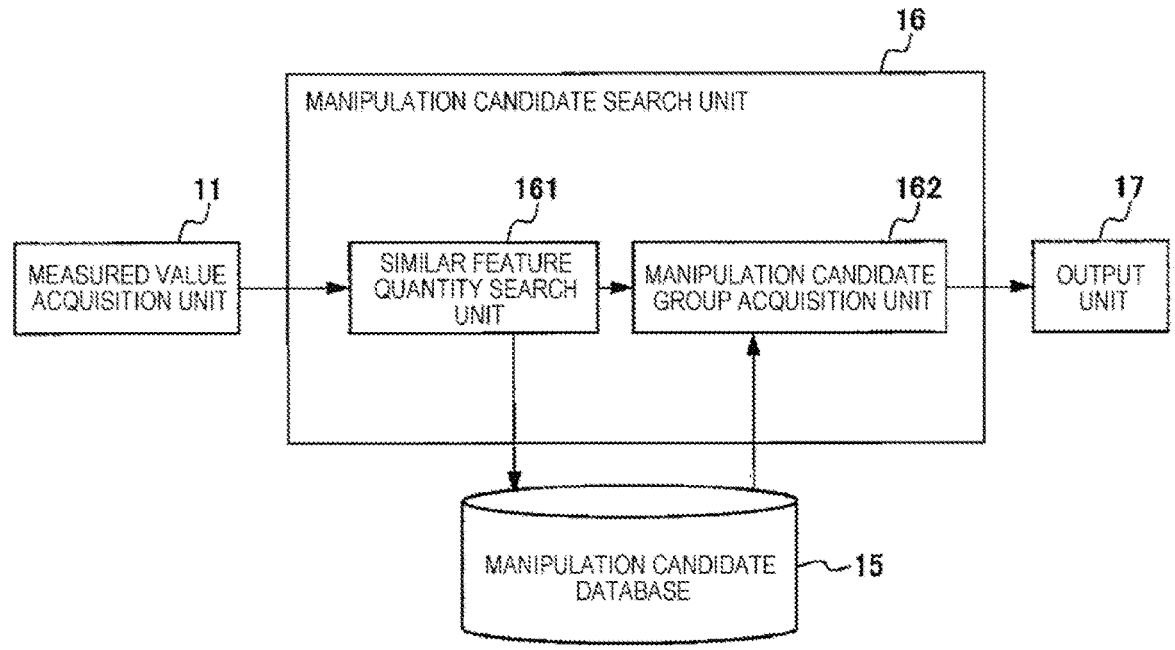
[FIG. 13]
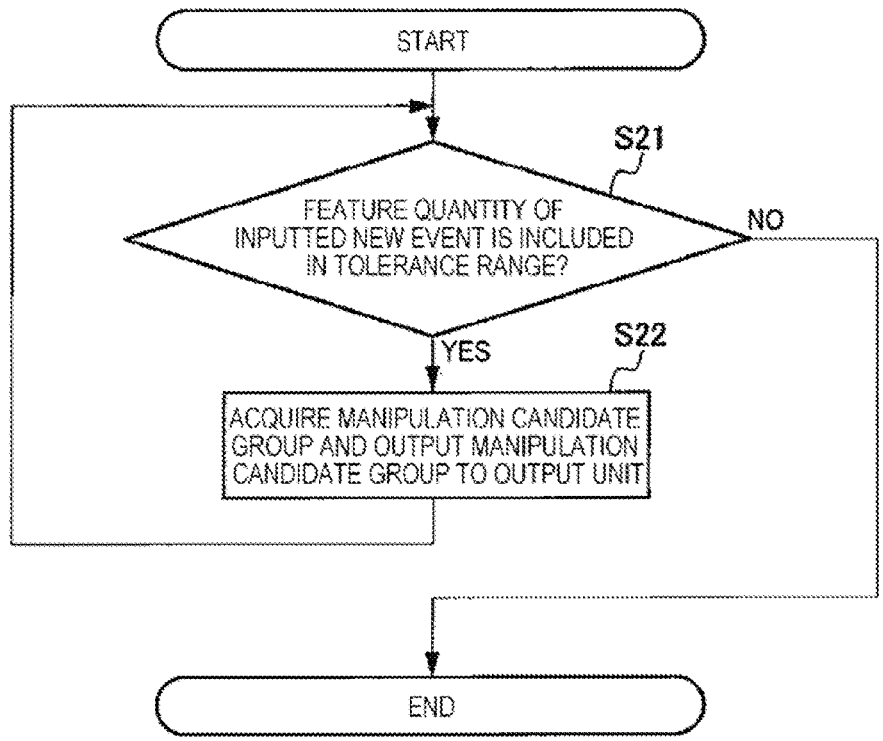

[FIG. 14]

W1 window containing W11 with device measurements and feature quantity table:

| | DEVICE | EVENT DETECTION TIME | FEATURE QUANTITY EXTRACTION TIME | VOLTAGE APPROXIMATION FORMULA COEFFICIENT 1 | ... | VOLTAGE APPROXIMATION FORMULA COEFFICIENT N |
|---|---|---|---|---|---|---|
| MEASURED VALUE | DEVICE NUMBER 1 | 2016/5/14 11:00 | 12.50 SECONDS | a1 | b1 | c1 |
| | DEVICE NUMBER 2 | 2016/5/14 11:00 | 12.50 SECONDS | a2 | b2 | c2 |
| | DEVICE NUMBER 3 | 2016/5/14 11:00 | 12.50 SECONDS | a3 | b3 | c3 |

W12:

| ORDER OF PRIORITY | MANIPULATION CANDIDATE GROUP | |
|---|---|---|
| | MEASURED VALUE FEATURE QUANTITY TOLERANCE RANGE | MANIPULATION CANDIDATE |
| 1 | ... | Op_C |
| 2 | ... | Op_C, Op_D |
| 3 | ... | Op_A, Op_B |

OPERATION ASSISTANCE DEVICE AND OPERATION ASSISTANCE METHOD

TECHNICAL FIELD

The present invention relates to an operation assistance device and an operation assistance method for assisting operation of an operation target for example.

BACKGROUND ART

In recent years, the use of natural energy typified by photovoltaic power generation, wind power generation, or the like has been increasing in various parts of the world. However, since it is not easy to constantly control the output of natural energy, the electric power system is unstable. In addition, due to natural disasters such as typhoons, torrential rain, heavy snowfall, and tornadoes, accidents occur in a wide area electric power system, and a power failure often occurs.

In various parts of the world such as North America, phasor measurement units (PMU) are introduced as a large number of measurement devices to stabilize the electric power system. However, a method of effectively utilizing measured data collected more frequently than a measurement device such as supervisory control and data acquisition (SCADA) conventionally used has not been sufficiently established yet.

For example, there is a work in which an electric power system operator (hereinafter, abbreviated as "operator") monitors the state of wide area fluctuation or the like by utilizing measured data. In such a work, along with the monitoring of the state of the electric power system, the importance of the manipulation work of the operator increases to maintain reliability. In the operation of the electric power system, there has been an attempt to store the measured data in a database as a past case, search measured data similar to the measured data of an event occurred in the electric power system from the database, and utilize the measured data.

Here, there is a technique disclosed in PTL 1 for obtaining an energy use assistance device which assists a power user so as to suppress peak power while avoiding degradation of service. PTL 1 discloses that "Optimization is performed by combining actual schedules recorded in the database on the basis of a plurality of constraint conditions and evaluation reference and an equipment operation schedule to control the operation of energy use equipment is created".

CITATION LIST

Patent Literature

PTL 1: JP-A-2003-23730

SUMMARY OF INVENTION

Technical Problem

However, in the operation work of the electric power system (also called "system operation work"), various manipulations are performed by the operator and the efficiency of the system operation work also varies depending on the combination of various manipulations. A candidate for a combination of operations for an operator to perform a certain system operation work is called an "operation candidate". The operator performs the system operation work by manipulation according to the manipulation candidate selected from a plurality of manipulation candidates.

However, since there are a large number of manipulation candidates, it is difficult for the operator to select an appropriate manipulation candidate within a few seconds for a system event (hereinafter, abbreviated as "event") occurring in the electric power system such as a failure or a phenomenon that becomes a precursor of a failure. For example, even when a technique for creating an equipment operation schedule disclosed in PTL 1 is used, the operator cannot appropriately select a manipulation candidate.

The present invention has been made in view of the above circumstances and an object thereof is to assist a system operation work for an operation target in which an event has occurred.

Solution to Problem

An operation assistance device reflecting one aspect of the present invention includes a past case database, a manipulation candidate classification unit, a manipulation candidate database, and a manipulation candidate search unit.

The past case database stores feature quantities corresponding to events occurred in an operation target in the past and extracted from measured values of the operation target in association with manipulation logs each indicating an operation content performed on the events.

The manipulation candidate classification unit classifies operation assistance device classifies manipulation logs associated with a plurality of the events stored in the past case database, as manipulation candidates, on the basis of measured value feature quantity tolerance ranges indicating tolerance ranges of the feature quantities, and groups the classified manipulation candidates and the measured value feature quantity tolerance ranges together to create manipulation candidate groups.

The manipulation candidate database stores the manipulation candidate groups.

The manipulation candidate search unit searches the manipulation candidate group associated with the feature quantity that is extracted from the measured value in the event occurred in the past event and is similar to the feature quantity extracted from the measured value in the event newly occurred from the manipulation candidate database. Then, manipulation candidate search unit outputs the manipulation candidate group to an output unit.

The operation assistance device is an aspect of the present invention and a method reflecting another aspect of the present invention or the like has the same configuration as the operation assistance device reflecting the aspect of the present invention.

Advantageous Effects of Invention

According to the present invention, for example, it is possible for an operator which performs a system operation work to perform appropriate manipulation to stabilize an operation target on the basis of the outputted manipulation candidate group.

The problems, configurations, and effects other than those described above will be clarified by the following description of the embodiment example.

BRIEF DESCRIPTION OF DRAWINGS

FIG. 1 is a block diagram showing a configuration example of an electric power system operation assistance system according to an embodiment of the present invention.

FIG. 2 is a block diagram showing a configuration example of an electric power system operation assistance device according to an embodiment of the present invention.

FIG. 3 is a block diagram showing a hardware configuration example of a computer according to an embodiment of the present invention.

FIG. 4 is a flowchart showing an example of a process procedure of the electric power system operation assistance device according to the embodiment of the present invention.

FIG. 5 is a block diagram showing a configuration example of a measured value acquisition unit according to an embodiment of the present invention.

FIG. 6 is an explanatory diagram showing an example of a temporal change in voltage according to an embodiment of the present invention.

FIG. 7 is a list showing a relationship between a measured value and a feature quantity according to an embodiment of the present invention.

FIG. 8 is an explanatory diagram showing a configuration example of a past case database according to an embodiment of the present invention.

FIG. 9 is a block diagram showing a configuration example of a manipulation candidate classification unit according to an embodiment of the present invention.

FIG. 10 is an explanatory diagram showing a configuration example of a manipulation candidate database according to an embodiment of the present invention.

FIG. 11 is a flowchart showing a process example of a manipulation candidate classification unit according to the embodiment of the present invention.

FIG. 12 is a block diagram showing a configuration example of a manipulation candidate search unit according to an embodiment of the present invention.

FIG. 13 is a flowchart showing a process example of the manipulation candidate search unit according to the embodiment of the present invention.

FIG. 14 is a user interface diagram showing a display example of an operation assistance screen according to an embodiment of the present invention.

DESCRIPTION OF EMBODIMENTS

Hereinafter, embodiment examples for carrying out the present invention will be described with reference to the accompanying drawings. In this specification and the drawings, by affixing the same reference numerals to components having the substantially same function or configuration, redundant description will be omitted.

First Embodiment

<Electric Power System Operation Assistance System>

FIG. 1 is a block diagram showing a configuration example of an electric power system operation assistance system 1.

The electric power system operation assistance system 1 includes an electric power system 30, a communication line 31, and a central command center 20.

The electric power system. 30 (an example of an operation target) is a system that includes from, for example, an extra-high voltage power transmission system of 500 kV or the like to a low voltage power distribution system of 6 kV or the like, and that supplies electric power transformed by various substations from a power plant to individual customers. The electric power system 30 is constituted with a plurality of power transmission and distribution lines and is constituted in a plurality of topologies such as a mesh-like system and a radial system. For example, in North America, there are many power transmission lines of high voltage system constituted in a mesh-like system. On the other hand, in Japan, there are many power transmission lines of high voltage system constituted in a radial system. However, the electric power system. 30 is generally constituted in a combination of various configurations including a mesh-like system, a radial system, and other configurations.

The communication line 31 connects the electric power system 30 with the central command center 20. The communication line 31 includes not only wired communication using an optical fiber, a coaxial line, or the like, but also power line communication (PLC). The communication line 31 may include wireless communication using microwaves or the like.

The central command center 20 is connected to the external electric power system 30 by the communication line 31 and performs monitoring of the electric power system 30. The central command center 20 may also be used as a control center for controlling the electric power system 30. The central command center 20 includes an electric power system operation assistance device 10, a display device 21, a monitoring control device 23, a system measurement device 24, and an input device 22.

The display device 21 can display information, results of processes, and the like outputted from the electric power system operation assistance device 10 on a screen. An operator can perform a system operation work while looking at an operation assistance screen W1 displayed on the display device 21. The display device 21 is, for example, a display device used in a personal computer terminal (PC). The detailed configuration of the operation assistance screen W 1 will be described with reference to FIG. 14 to be described later.

The input device 22 can input a manipulation log D2 representing a manipulation history performed by the operator, which is required in the electric power system operation assistance device 10. In addition, the input device 22 can input a measured value feature quantity tolerance range D3 and the like used to determine the similarity of the feature quantity of a measured value D1, or the like. The input device 22 may be, for example, a PC terminal provided with a keyboard, a mouse, and the like, and performs a predetermined manipulation input and instruction by the operator.

The measured value D1 is an example of measured data measured by, for example, a PMU, as a measurement device, and since the device number is attached, the measured value D1 can be identified for each device number. The measured value is associated with physical information including the voltage, current, phase, frequency, active power, reactive power, and the like of the electric power system, and includes temporal information. The temporal information is information indicating time such as year, month, day, hour, minute, second, or the like, or information indicating a relative time relationship with reference time.

The manipulation log D2 is information including a manipulation history performed by the operator through the input device 22, such as system switching manipulation, generator output suppression, generator shutdown, load cut-off, or the like. In addition, the manipulation log may include the temporal information, unique information such as the serial number of the manipulation target device, and the like on the above-described measured value D1. For example, the manipulation log D2 may be information manually inputted from the input device 22 or may be information collected from the electric power system 30 by the monitoring control device 23.

The measured value feature quantity tolerance range D3 is data indicating the tolerance range of the feature quantity of the measured value D1 and is used as a threshold value for determining the similarity of the feature quantities respectively extracted from the past measured value D1 and the current measured value D1. The measured value feature quantity tolerance range D3 can be set by the operator through the input device 22.

The monitoring control device 23 can collect system information on the electric power system 30 through the communication line 31. For example, the monitoring control device 23 may collect various digital data or analog data related to the electric power system 30.

The system measurement device 24 can collect the measured value D1 showing the state of the electric power system 30 through the communication line 31. The measured value D1 collected by the system measurement device 24 is inputted into the electric power system operation assistance device 10. The system measurement device 24 may be, for example, a phasor data concentrator (PDC) capable of collecting measured data from the PMU.

In the embodiment example, the monitoring control device 23 and the system measurement device 24 are described as separate devices, but may be constituted as a single device having both functions.

Here, due to various factors such as climatic factors such as lightning, strong wind, heavy rain, heavy snow, typhoons, tornadoes, human error factors such as work errors in maintenance work, external factors such as an aircraft accident, and the like, there is a possibility of abnormality in the electric power system 30. As abnormal cases, for example, there is a case where a power failure may occur at a customer due to a cause typified by disconnection, ground fault, short circuit, and the like, and even in a case where a power failure does not occur, abnormality in the voltage, frequency, tidal current and the like, such as a contact between trees and the power transmission line, may temporarily occur. In the central command center 20, as the monitoring control device 23 and the system measurement device 24 grasp the state of the electric power system 30, the voltage, current, frequency, active power, reactive power, and the like of electric power system 30 are constantly measured.

<Electric Power System Operation Assistance Device>

Next, a configuration example of the electric power system operation assistance device 10 will be described.

FIG. 2 is a block diagram showing a configuration example of the electric power system operation assistance device 10.

The electric power system operation assistance device includes a measured value acquisition unit 11, a manipulation log addition unit 12, a past case database 13, a manipulation candidate classification unit 14, a manipulation candidate database 15, a manipulation candidate search unit 16, and an output unit 17. In the electric power system operation assistance device 10, the above-described measured value D1, manipulation log D2, and measured value feature quantity tolerance range D3 are used as input information.

The measured value acquisition unit 11 acquires the measured value D1 from the system measurement device 24 and extracts a feature quantity from the measured value D1. AT this time, the measured value acquisition unit 11 detects an event such as a failure or a phenomenon that becomes a precursor of a failure which has occurred in the electric power system 30 from the measured value D1. For example, in a case where the measured value D1 is changed compared to the normal value, an event is detected by the measured value acquisition unit 11. Then, the measured value acquisition unit 11 extracts the feature quantity associated with the event from the measured value D1. The measured value acquisition unit 11 outputs the feature quantity extracted from the measured value D1 to the manipulation log addition unit 12. The feature quantity is an index indicating a characteristic change of the measured value D1 for a predetermined period of time after the event has been detected. As the feature quantity, for example, the fluctuation frequency or attenuation rate of the tidal current may be used, and other indices such as coefficients of the approximate polynomial of the voltage may be used. In addition, the system information may be inputted from the monitoring control device 23 to the measured value acquisition unit 11.

The manipulation log addition unit 12 adds the separately inputted manipulation log D2 to the feature quantity of the measured value D1 inputted from the measured value acquisition unit 11 and stores the feature quantity of the measured value D1 to which the manipulation log D2 has been added in the past case database 13.

The past case database 13 stores feature quantities of a single or a plurality of measured values D1 extracted from the measured data outputted from the electric power system 30 for each event using various events that occurred in the electric power system 30 in the past as past case data. This feature quantity is stored in the past case database 13 as the manipulation log information associated with the manipulation log D2 indicating the manipulation content performed on the event occurred in the past. However, even in a case where an event currently occurs in the electric power system 30, the measured value D1 and the manipulation log D2 are stored in the past case database 13 in real time. A plurality of past case data stored in the past case database 13 are appropriately read by the manipulation candidate classification unit 14.

The manipulation candidate classification unit 14 classifies the manipulation logs D2 associated with a plurality of events stored in the past case database 13, as manipulation candidates, on the basis of the measured value feature quantity tolerance range D3 separately inputted from the input device 22. At this time, the manipulation candidate classification unit 14 classifies the manipulation logs D2 associated with the feature quantities falling in the measured value feature quantity tolerance range D3 as manipulation candidates. The manipulation candidate classification unit 14 groups the classified manipulation candidates and the measured value feature quantity tolerance ranges D3 together to create a single or a plurality of manipulation candidate groups, and outputs the created manipulation candidate groups to the manipulation candidate database 15.

The manipulation candidate database 15 stores the measured value feature quantity tolerance ranges D3 indicating the tolerance ranges of the feature quantities for the single or the plurality of manipulation candidate groups inputted from the manipulation candidate classification unit 14 for each device number of the measurement devices. Further, the manipulation candidate database 15 stores an evaluation scale by which a plurality of the manipulation candidates stored as the manipulation candidate groups has been ranked, and the manipulation candidates together. In the manipulation candidate group, a plurality of manipulation candidates may be included.

A series of processes are repeatedly performed from the measured value acquisition unit 11 to the manipulation candidate classification unit 14. Such a series of processes may be performed periodically, may be started at the timing when an event is detected by the measured value acquisition unit 11 from the measured value D1, or may be started at an arbitrary timing by the manipulation from the input device 22.

Here, when a new event occurs in the electric power system operation assistance device 10, the measured value acquisition unit 11 extracts a feature quantity from the newly inputted measured value D1 and outputs the feature quantity of the measured value D1 to the manipulation candidate search unit 16 and the manipulation log addition unit 12. Processes in and after the manipulation log addition unit 12 are as described above.

The manipulation candidate search unit 16 searches a manipulation candidate group that is associated with the feature quantity extracted from the measured value D1 in the event occurred in the past and similar to the feature quantity of the measured value D1 extracted by the measured value acquisition unit 11, from the manipulation candidate database 15. Then, the manipulation candidate search unit 16 outputs the manipulation candidate group to the output unit 17.

The output unit 17 outputs and displays an operation assistance screen W1 that shows the manipulation candidate groups corresponding to the events and inputted from the manipulation candidate search unit 16, on the display device 21 and the like so as to assist the operator in performing a system operation work.

Next, the hardware configuration of a computer C constituting the electric power system operation assistance device 10 will be described.

FIG. 3 is a block diagram showing a hardware configuration example of the computer C.

The computer C is a hardware used as a so-called computer. The computer C includes a central processing unit (CPU) C1, a read only memory (ROM) C2, and a random access memory (RAM) C3, which are respectively connected to a bus C4. The computer C further includes a nonvolatile storage C5, and a network interface C6.

The CPU C1 reads a program code of software for realizing each function according to the embodiment from the ROM C2 and executes the program. In the RAM C3, variables, parameters, and the like that occur in the middle of the arithmetic process are temporarily written. As the nonvolatile storage C5, for example, a hard disk drive (HDD), a solid state drive (SSD), a flexible disk, an optical disk, a magneto-optical disk, CD-ROM, CD-R, magnetic tape, a non-volatile memory or the like may be used. In this nonvolatile storage C5, in addition to the operating system (OS), various parameters, a program for causing the computer C to function is recorded. The ROM C2 and the nonvolatile storage C5 stores programs and data necessary for the CPU C 1 to operate and are used as an example of a computer readable non-transitory recording medium storing a program executed by the computer C. Therefore, in the ROM C2 and the nonvolatile storage C5, this program is permanently stored.

For the network interface C6, for example, a network interface card (NIC) or the like is used and various data can be transmitted and received through a local area network (LAN) to which a terminal is connected, a dedicated line, and the like. Therefore, the electric power system operation assistance device 10 can receive the system information from the monitoring control device 23 through the network interface C6, receive the measured value D1 from the system measurement device 24, and receive the manipulation log D2 and the measured value feature quantity tolerance range D3 from the input device 22. In addition, the electric power system operation assistance device 10 can transmit the operation assistance screen W1 to the display device 21 through the network interface C6.

<Process Procedure of Electric Power System Operation Assistance Device>

FIG. 4 is a flowchart showing an example of a process procedure of the electric power system operation assistance device 10. Through this flowchart, an operation assistance method is realized by the electric power system operation assistance device 10.

First, the measured value acquisition unit 11 determines whether or not a measured value D1 is inputted (S1). In a case where the measured value D1 is not inputted (NO in S1), the measured value acquisition unit 11 returns to Step S1 and continues to determine whether or not the measured value D1 is inputted.

In a case where the measured value D1 is inputted (YES in S1), the measured value acquisition unit 11 determines whether or not an event is detected from the measured value D1 (S2). In a case where an event is not detected (NO in S2), the measured value acquisition unit 11 returns to Step S1. In a case where an event is detected (YES in S2), the measured value acquisition unit 11 further extracts a feature quantity of the measured value D1. Thereafter, the process proceeds to next Steps S3 and S5. Processes after Steps S3 and S5 are performed in parallel.

After Step S2, the manipulation log addition unit 12 performs a process of adding a manipulation log D2 to the feature quantity of the measured value D1 (S3) and the manipulation candidate classification unit 14 performs a process of creating a manipulation candidate group (S4).

In addition, after Step S2, the manipulation candidate search unit 16 performs a process of acquiring a manipulation candidate group from the manipulation candidate database 15 (S5) and the output unit 17 performs manipulation assistance for the operator by displaying an operation assistance screen W1 (S6). After Steps S4 and S6, the process returns to Step S1 and the measured value acquisition unit 11 continue to determine whether or not the measured value D1 is inputted.

<Measured Value Acquisition Unit>

Next, the configuration example of the measured value acquisition unit 11 will be described.

FIG. 5 is a block diagram showing a configuration example of the measured value acquisition unit 11.

The measured value acquisition unit 11 includes an event detection unit 111, a feature quantity extraction unit 112, and a normal value database 113.

The event detection unit 111 detects the occurrence of an event in the electric power system 30 by a change of the single or plurality of measured values D1 inputted. At this time, the event detection unit 111 compares a normal value with the measured value D1 with reference to the normal value database 113. Then, the event detection unit 111 detects an event which is thought to have occurred in the electric power system 30, for example, in a case where the measured value D1 is changed greater than the normal value.

The feature quantity extraction unit 112 extracts the feature quantity of the measured value D1 during the period of the occurrence of the event detected by the event detection unit 111. The feature quantity of the measured value D1 extracted by the feature quantity extraction unit 112 is outputted to the manipulation log addition unit 12 and the manipulation candidate search unit 16.

The normal value database 113 stores the normal value of the electric power system 30 in a normal state. The normal value database 113 may be provided outside the measured value acquisition unit 11.

Here, in a case where the measured value D1 is a voltage V, a change in the voltage V at the time of the occurrence of the event will be described.

FIG. 6 is an explanatory diagram showing an example of a temporal change in voltage V. FIG. 6 shows a graph in which the horizontal axis represents time T and the vertical axis represents voltage V.

As a method of detecting an event by the event detection unit 111, besides the aforementioned method of comparing with the normal value, for example, a method in which a case where the voltage V is statistically processed and abnormality is statistically detected is determined as event detection may be used. By this method, the event detection unit 111 can also detect a significant change in the voltage V with respect to the time T. For example, it is assumed that the time during which grounding of a power transmission line or the like occurs is an event detection time 111*a*. Thereafter, when the voltage V temporarily drops and the power transmission line is reclosed, the voltage V recovers to the vicinity of the original value before the occurrence of the event. Therefore, the event detection unit 111 detects the period of time until the voltage V is recovered to the vicinity of the original value after it has been greatly changed as an event detection period 111*b*.

Then, the period of time until the event occurred in the event detection time 111*a* is converged and the change in the voltage V is converged to the normal value is referred to as a feature quantity extraction period 112*a* of the measured value D1 with respect to the time T. The feature quantity extraction unit 112 extracts the feature quantity of the change in the voltage V for the feature quantity extraction period 112*a*. As a method of extracting the feature quantity of the change in the voltage V by the feature quantity extraction unit 112, for example, a method of approximating the change of the voltage V with a polynomial can be used. Therefore, the coefficients of the polynomials may be used as feature quantities, and other values may be used as feature quantities.

Next, the relationship between measured value D1 and feature quantity will be described.

FIG. 7 is a list showing a relationship between the measured value D1 and the feature quantity.

The measured value D1 includes measured data outputted from the measurement devices of device numbers 1 to 3. The feature quantity of the measured value D1 is expressed as information in which the event detection time, the feature quantity extraction time, the voltage approximation formula coefficient 1, . . . , and N, and the like are combined for each of the device numbers 1 to 3. From this list, it is found that at the time when a certain event occurred at "11 o'clock in May 15, 2016", the feature quantity of the measured value D1 is extracted for "12.50 seconds", which is a period of time from the event detection time 111*a* to the feature quantity extraction period 112*a* by the feature quantity extraction unit 112. Then, as the feature quantity of the measured value D1, a voltage approximation formula coefficient is specified for each device number allocated to the measurement device.

The method of event detection and feature quantity extraction is not limited to the method described in this embodiment. For example, an oscillating frequency mode and an attenuation factor may be used as a feature quantity or another method may be adopted.

<Manipulation Log Addition Unit>

Next, the feature quantity to which the manipulation log D2 is added will be described.

FIG. 8 is an explanatory diagram showing a configuration example of the past case database 13.

The list shown in FIG. 8 shows that a manipulation log Op_A extracted from the manipulation log D2 and an event identification number Xn are added to the feature quantity of the measured value D1 shown in the list of FIG. 7. The manipulation log Op_A indicates a history of manipulation contents performed by the operator, such as system configuration changeover, generator output suppression, load cutoff, and the like, and is constituted with a single or plurality of series of manipulation contents. The event identification number Xn is a unique number allocated for each event detected by the measured value acquisition unit 11. From the list configured in the past case database 13, for example, in a case where the feature quantity is the voltage approximation formula coefficient 1, the manipulation log Op_A and the event identification number Xn are specified. The manipulation log Op_A and the event identification number Xn can be specified using the plurality of feature quantities.

<Manipulation Candidate Classification Unit>

Next, the configuration example of the manipulation candidate classification unit 14 will be described.

FIG. 9 is a block diagram showing an internal configuration example of the manipulation candidate classification unit 14.

The manipulation candidate classification unit 14 includes a feature quantity evaluation unit 141 and a manipulation candidate group creation unit 142.

The feature quantity evaluation unit 141 compares the feature quantities stored in the past case database 13 and extracted from the measured values D1 in the events occurred in the past and the measured value feature quantity tolerance ranges D3. Then, the feature quantity evaluation unit 141 evaluates whether or not the feature quantities of the measured values D1 fall in the measured value feature quantity tolerance ranges D3. In a case where the feature quantities of the measured values D1 fall in the measured value feature quantity tolerance ranges D3, the manipulation indicated by the manipulation log D2 read from the past case database 13 is included in the manipulation candidate group in which the manipulation candidates performed in a specific event are collected.

The manipulation candidate group creation unit 142 creates the manipulation candidates including a single or a plurality of manipulation logs D2 added to the feature quantities falling in the measured value feature quantity tolerance ranges D3 on the basis of the evaluation result of the feature quantities of the measured values D1 as manipulation candidate groups. Then, the manipulation candidate group creation unit 142 stores the manipulation candidate groups in the manipulation candidate database 15.

FIG. 10 is an explanatory diagram showing a configuration example of the manipulation candidate database 15.

The manipulation logs D2 corresponding to the feature quantities of the measured values D1 that falls in the tolerance range corresponding to each measurement device identified by the device numbers are grouped as manipulation candidates.

For example, in a manipulation candidate group 1, x11 to y11 (device number 1), x21 to y21 (device number 2), and x31 to y31 (device number 3) are shown as the tolerance range of the feature quantities of the measured values D1 for each device in the measured value feature quantity tolerance range D3. Then, in the manipulation candidate group 1, manipulation candidates Op_A, Op_B, and Op_C are grouped.

For example, in a case where x11 to y11 have a tolerance range of "10" to "20", when the feature quantity indicated by the device number 1 is "15", it is evaluated by the feature quantity evaluation unit 141 that the feature quantity indicated by the device number 1 falls in the tolerance range. However, in a case where the feature quantity indicated by the device number 1 is "25", it is evaluated by the feature quantity evaluation unit 141 that the feature quantity indicated by the device number 1 does not fall in the tolerance range. The feature quantity tolerance range may include temporal information.

In addition, when one of the feature quantities of the measured values D1 outputted from the plurality of measurement devices does not fall in the tolerance range, the manipulation log is not considered as a manipulation candidate. For example, in the manipulation candidate group 1, when the feature quantities indicated by the device numbers 1 to 3 do not fall in the ranges of x11 to y11, x21 to y21, and x31 to y31, respectively, Op_A, Op_B, and Op_C are not considered as manipulation candidates.

Although there may be a plurality of manipulation candidates, it is difficult for the operator to immediately determine an appropriate manipulation candidate. Therefore, an evaluation scale for indicating an optimum manipulation candidate is added to the manipulation candidate. This evaluation scale is included in the manipulation log D2, but the evaluation scale may be separately set by the input device 22. For example, in a case of focusing on the manipulation candidate group 1, "⊙" attached to the manipulation candidate Op_A is an evaluation scale indicating that the manipulation result is good and the operation cost is low. "Δ" attached to the manipulation candidate Op_B is an evaluation scale indicating that while the manipulation result is good, the operation cost is high. "X" attached to the manipulation candidate Op_C is an evaluation scale indicating that the manipulation result is poor and the operation cost is high. In addition, "X" is also attached to manipulation candidates forbidden by specific regulations and manipulation rules. The evaluation scales attached to the manipulation candidates in FIG. 10 are for convenience and may be represented by a combination of alphanumeric characters, symbols, or the like.

FIG. 11 is a flowchart showing a process example of the manipulation candidate classification unit 14.

First, the feature quantity evaluation unit 141 determines whether or not there is an event stored in the past case database 13 (S11). Here, the event for which the presence or absence of saving is determined is an event for which a manipulation candidate group has not yet been created. Therefore, in a case of an event of which the manipulation candidate group is not created, it is called that the event is stored in the past case database 13. In a case where the event is not stored in the past case database 13 (NO in S11), the feature quantity evaluation unit 141 ends the process.

On the other hand, in a case where the event is stored in the past case database 13 (YES in S11), the feature quantity evaluation unit 141 determines whether or not the feature quantity of the measured value D1 stored in the past case database 13 falls in the measured value feature quantity tolerance range D3 shown in FIG. 10 (S12). In a case where the feature quantity of the measured value D1 does not fall in the measured value feature quantity tolerance range D3 (NO in S12), the process returns to Step S11.

On the other hand, in a case where the feature quantity of the measured value D1 falls in the measured value feature quantity tolerance range D3 (YES in S12), the manipulation candidate classification unit 14 performs a process of creating a manipulation candidate group (S13). This manipulation candidate group is stored in the manipulation candidate database 15. Thereafter, the process returns to Step S11.

<Manipulation Candidate Search Unit>

Next, the configuration example of the manipulation candidate search unit 16 will be described.

FIG. 12 is a block diagram showing a configuration example of the manipulation candidate search unit 16.

The manipulation candidate search unit 16 includes a similar feature quantity search unit 161 and a manipulation candidate group acquisition unit 162.

The similar feature quantity search unit 161 searches the manipulation candidate group that is associated with the feature quantity extracted from the measured value D1 in the event occurred in the past and similar to the feature quantity of the measured value D1 extracted by the measured value acquisition unit 11, from the manipulation candidate database 15.

In a case where the manipulation candidate group is stored in the manipulation candidate database 15, the manipulation candidate group acquisition unit 162 acquires the manipulation candidate group searched from the manipulation candidate database 15 by the similar feature quantity search unit 161 and outputs the manipulation candidate group to the output unit 17. This manipulation candidate group include a manipulation candidate that is indicated by the feature quantity extracted from the measured value D1 in the event occurred in the past and similar to the feature quantity of a measured value D1 of a new event. At this time, the manipulation candidate group acquisition unit 162 can output the manipulation candidate group and the evaluation scale acquired from the manipulation candidate database 15 to the output unit 17.

The output unit 17 generates an operation assistance screen W1 and causes the display device 21 to display the operation assistance screen W1. The operation assistance screen W1 displays the manipulation candidate group as shown in FIG. 14, which will be described later. Since this manipulation candidate group includes the manipulation candidate performed on the event occurred in the past, the operator can perform manipulation similar to the manipulation performed in the past case (event).

FIG. 13 is a flowchart showing a process example of the manipulation candidate search unit 16.

First, the similar feature quantity search unit 161 determines whether or not the feature quantity extracted from the measured value D1 in a new event fall in the tolerance range of the manipulation candidate group stored in the manipulation candidate database 15 (S21). In a case where the feature quantity extracted from the measured value D1 in a new event does not fall in the tolerance range of the manipulation candidate group (NO in S21), the similar feature quantity search unit ends the process.

On the other hand, in a case where the feature quantity extracted from the measured value D1 in a new event falls in the tolerance range of the manipulation candidate group (YES in S21), the manipulation candidate group acquisition unit 162 acquires the manipulation candidate group from the manipulation candidate database 15 and outputs the manipulation candidate group to the output unit 17 (S22). Thereafter, the process returns to Step S21.

<Operation Assistance Screen>

FIG. 14 is a user interface diagram showing a display example of the operation assistance screen W1.

The operation assistance screen W1 is a screen that is created by the output unit 17 when an event occurs in the electric power system 30 and is displayed on the display device 21. This operation assistance screen W1 has a measured value feature quantity display screen W11 and a manipulation candidate group display screen W12.

The measured value feature quantity display screen W11 displays, for example, a list showing the relationship between the measured value D1 and the feature quantity as shown in FIG. 7 together with the graph of the measured value D1 for each device number as shown in FIG. 6. In this example, all of the changes in the measured values D1 outputted by the measuring devices of the device numbers 1 to 3 are shown by similar waveforms but may be different from each other.

The manipulation candidate group display screen W12 displays, for example, a manipulation candidate group including manipulation candidates sorted in the order of priority on the basis of the evaluation scale of the manipulation candidate in FIG. 10. The manipulation candidate group includes the measured value feature quantity tolerance range D3 and a single or a plurality of manipulation candidates. The operator can select a manipulation candidate with high order of priority while looking at the manipulation candidate group display screen W12, and respond to the event. However, the manipulation candidate selected by the operator may be of low order of priority.

In the electric power system operation assistance device 10 according to the embodiment described above, when an event occurs, the operation assistance screen W1 can be displayed on the display device 21. As a result, the operator can acquire a manipulation candidate in a short time and with high reliability for the event currently occurring in the electric power system 30. Therefore, it is possible to obtain the effect of improving the accuracy and improving the reliability and stability of the electric power system operation by more appropriately determining the control manipulation of the operator.

In addition, since the manipulation candidates are displayed as narrowed-down manipulation candidate groups on the operation assistance screen W1, the operator can easily select an appropriate manipulation candidate. As a result, the reliability of the system operation work for the electric power system 30 is improved.

Modification

The above-described embodiment is for assisting the system operation work for the electric power system 30 as an operation target. However, by replacing the electric power system 30 with, for example, a chemical plant, a control system, and the like, the embodiment can also be used to assist a system operation work for these plant, system, and the like as operation targets.

In addition, when an event occurs, a predetermined period of time indicated by the feature quantity extraction period 112a is required until the measured value D1 is stabilized as shown in FIG. 6. However, the predetermined period of time required until the measured value D1 is stabilized varies depending on the manipulation candidate shown in FIG. 10. Therefore, in FIG. 10, the evaluation scale including the predetermined period of time required until the measured value D1 is stabilized may be used. This evaluation scale may be shown in combination with the cost and manipulation result.

The present invention is not limited to the embodiments described above and it goes without saying that various other applications and modifications can be made without departing from the gist of the present invention described in the claims.

For example, the electric power system operation assistance device 10 is one embodiment of the present invention, the configuration is not restricted by the embodiment, and the obtained effects are not affected.

For example, the process procedures shown in the flowcharts in FIGS. 4, 11, and 13 are merely examples and the embodiments and the effects of the embodiments of the present invention are not limited by the process procedures. The present invention can be implemented by procedures different from the process procedures of the present invention.

In addition, the above-described embodiments are explained in details for better understanding of the present invention and are not limited to those including all the configurations described above. A part of the configuration of one embodiment may be replaced with that of another embodiment, and the configuration of one embodiment may be incorporated to the configuration of another embodiment. With respect to a part of the configuration of each embodiment, addition of a different configuration, deletion or replacement can be made.

The drawings illustrate control lines and information lines as considered necessary for explanation but do not illustrate all control lines or information lines in the products. It may be considered that almost of all components are actually interconnected.

REFERENCE SIGNS LIST

1: electric power system operation assistance system
10: electric power system operation assistance device
11: measured value acquisition unit
12: manipulation log addition unit
13: past case database
14: manipulation candidate classification unit
15: manipulation candidate database
16: manipulation candidate search unit
17: output unit
30: electric power system
111: event detection unit
112: feature quantity extraction unit
113: normal value database
141: feature quantity evaluation unit
142: manipulation candidate group creation unit
161: similar feature quantity search unit
162: manipulation candidate group acquisition unit

The invention claimed is:

1. An operation assistance device comprising:
a past case database that stores feature quantities corresponding to events occurred in an operation target in the past and extracted from measured values of the operation target in association with manipulation logs each indicating an operation content performed on the events;
a manipulation candidate classification unit that classifies the manipulation logs associated with a plurality of the events stored in the past case database, as manipulation candidates, on the basis of measured value feature quantity tolerance ranges indicating tolerance ranges of the feature quantities, and groups the classified manipulation candidates and the measured value feature quantity tolerance ranges together to create manipulation candidate groups;

a manipulation candidate database that stores the manipulation candidate groups; and a manipulation candidate search unit that searches the manipulation candidate group associated with the feature quantity which is extracted from the measured value in the event occurred in the past and is similar to the feature quantity extracted from the measured value in the event newly occurred from the manipulation candidate database, and that outputs the manipulation candidate group to an output unit;

wherein the manipulation candidate classification unit includes a feature quantity evaluation unit that compares the feature quantities stored in the past case database and extracted from the measured values in the events occurred in the past with the measured value feature quantity tolerance ranges and evaluates whether or not the feature quantities fall in the measured value feature quantity tolerance ranges, and a manipulation candidate group creation unit that creates the manipulation candidates including a single or a plurality of manipulation logs associated with the feature quantities falling in the measured value feature quantity tolerance ranges as the manipulation candidate group.

2. The operation assistance device according to claim 1, further comprising:

a measured value acquisition unit that acquires the measured value and extracts the feature quantity from the measured value; and a manipulation log addition unit that adds the manipulation log to the feature quantity and stores the feature quantity to which the manipulation log has been added in the past case database.

3. The operation assistance device according to claim 2, wherein the manipulation candidate search unit includes a similar feature quantity search unit that searches the manipulation candidate group that is associated with the feature quantity extracted from the measured value in the event occurred in the past and similar to the feature quantity of the measured value extracted by the measured value acquisition unit, from the manipulation candidate database, and a manipulation candidate group acquisition unit that acquires the manipulation candidate group searched by the similar feature quantity search unit from the manipulation candidate database.

4. The operation assistance device according to claim 3, wherein the measured value acquisition unit includes an event detection unit that detects occurrence of the event by a change of the measured value, and a feature quantity extraction unit that extracts the feature quantity of the measured value for a period of time of the event occurrence detected by the event detection unit.

5. The operation assistance device according to claim 4, wherein the manipulation candidate database stores the measured value feature quantity tolerance ranges indicating tolerance ranges of the feature quantities for a single or a plurality of the manipulation candidate groups for each device number of the measured values, an evaluation scale for ranking a plurality of manipulation candidates stored as the manipulation candidate groups, and the manipulation candidates, and the manipulation candidate group acquisition unit outputs the evaluation scale acquired from the manipulation candidate database and the manipulation candidate groups to the output unit.

6. The operation assistance device according to claim 5, wherein the output unit causes a display device to display an operation assistance screen showing the manipulation candidate groups.

7. The operation assistance device according to claim 1, wherein the operation target is an electric power system.

8. An operation assistance method comprising:

a step of, from a past case database that stores feature quantities corresponding to events occurred in an operation target in the past and extracted from measured values of the operation target in association with manipulation logs each indicating an operation content performed on the events, classifying the manipulation logs associated with a plurality of the events stored in the past case database, as manipulation candidates, on the basis of measured value feature quantity tolerance ranges indicating tolerance ranges of the feature quantities, and grouping the classified manipulation candidates and the measured value feature quantity tolerance ranges together to create manipulation candidate groups; and a step of searching the manipulation candidate group associated with the feature quantity that is extracted from the measured value in the event occurred in the past and is similar to the feature quantity extracted from the measured value in the event newly occurred from the manipulation candidate database which stores the manipulation candidate groups, and outputting the manipulation candidate group to an output unit;

wherein the step of classifying includes comparing the feature quantities stored in the past case database and extracted from the measured values in the events occurred in the past with the measured value feature quantity tolerance ranges, evaluating whether or not the feature quantities fall in the measured value feature quantity tolerance ranges, and creating the manipulation candidates including a single or a plurality of manipulation logs associated with the feature quantities falling in the measured value feature quantity tolerance ranges as the manipulation candidate group.

* * * * *